United States Patent [19]
Arnold et al.

[11] 4,291,002
[45] Sep. 22, 1981

[54] PROCESS FOR PRODUCING SODIUM CARBONATE FROM COMPLEX BRINES

[75] Inventors: Donald S. Arnold, Bethany, Okla.; James L. Fairchild; Donald A. Nichols, both of Trona, Calif.; Merlin D. Coe, Oklahoma City, OK

[73] Assignee: Kerr-McGee Chemical Corporation, Oklahoma City, Okla.

[21] Appl. No.: 844,847

[22] Filed: Oct. 25, 1977

[51] Int. Cl.$^3$ .......................... C01D 7/00; C01D 7/37
[52] U.S. Cl. .................................... 423/189; 423/190; 423/422; 423/426; 423/427
[58] Field of Search .............. 423/189, 190, 422, 186, 423/421, 426, 427; 23/302 T

[56] References Cited

U.S. PATENT DOCUMENTS

| | | | |
|---|---|---|---|
| 1,865,833 | 7/1932 | Chesny | 423/188 |
| 2,693,403 | 11/1954 | Brumbaugh et al. | 423/421 |
| 2,962,348 | 11/1960 | Seglin et al. | 423/206 T |
| 3,028,215 | 4/1962 | Frint | 423/202 |
| 3,188,170 | 6/1965 | Mantz et al. | 423/425 |
| 3,717,698 | 2/1973 | Ilardi et al. | 423/206 |
| 3,900,292 | 8/1975 | Fairchild | 23/273 R |

OTHER PUBLICATIONS

Manufacture of Soda by Te-Pang Hou, Ph.D., Reinhold Publishing Corporation (1942), pp. 173-179.

*Primary Examiner*—O. R. Vertiz
*Assistant Examiner*—Wayne A. Langel
*Attorney, Agent, or Firm*—William G. Addison

[57] ABSTRACT

A process for the production of sodium carbonate wherein sodium bicarbonate is recovered from a brine containing sodium carbonate by carbonation of the brine under controlled conditions. The sodium bicarbonate is crystallized from the carbonated brine in a multi-stage carbonating, cooling and crystallization process after which it is filtered to produce wet cake. The wet cake is subjected to predrying to provide a predried wet cake of a specified free moisture content and mixed with recycle light ash to provide a dryer feed of specified moisture content to alleviate problems of product fouling or plugging of the dryer. The light ash from the dryer then is bleached and subjected to recrystallization, screening, centrifuging and drying to provide a dried sodium carbonate possessing, after evaporation of the water of hydration and free moisture, less than 0.10 percent moisture and chemical and physical properties meeting commercial dense ash specifications.

12 Claims, 2 Drawing Figures

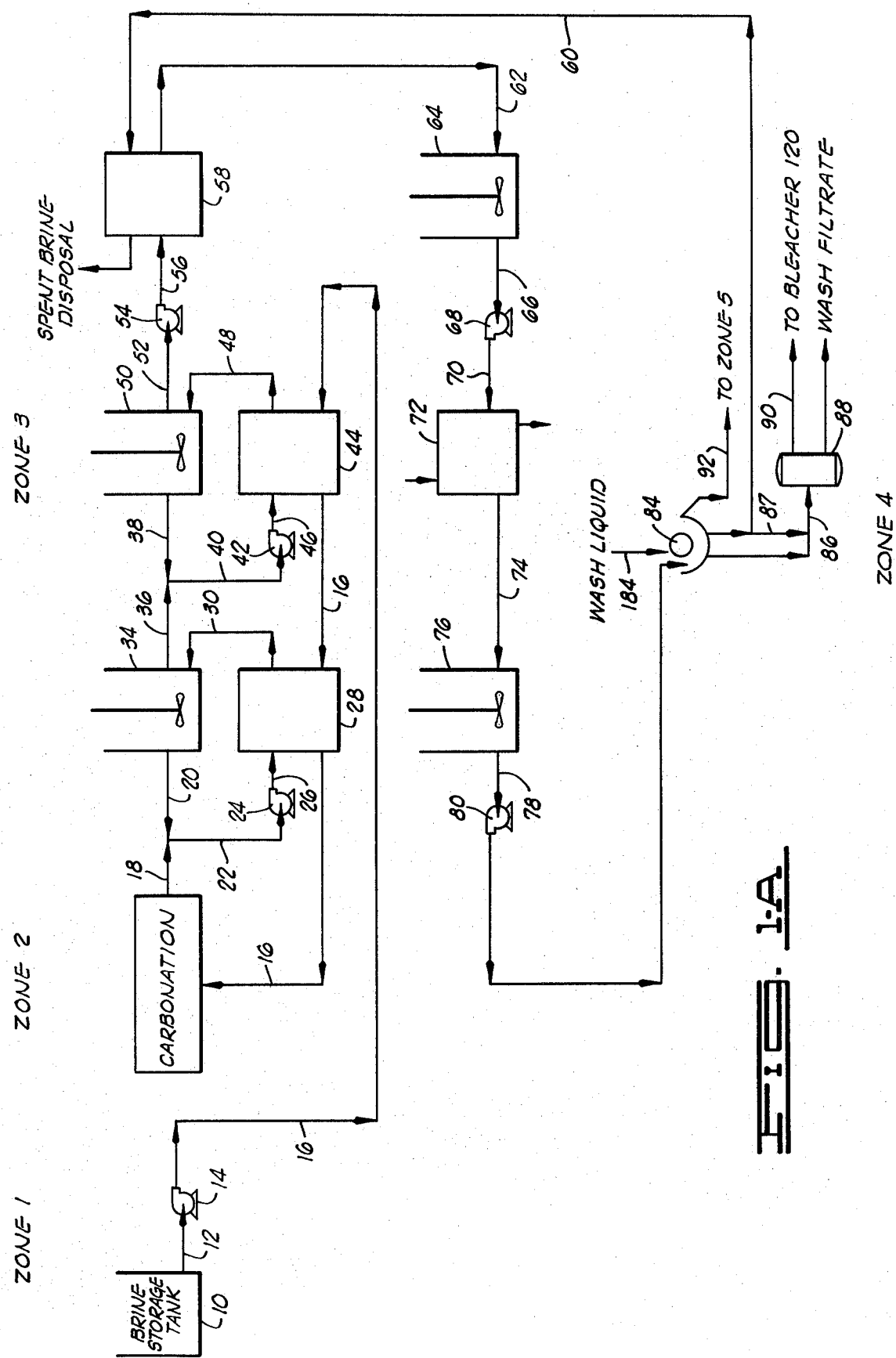
FIG. 1-A

PROCESS FOR PRODUCING SODIUM CARBONATE FROM COMPLEX BRINES

CROSS REFERENCE TO RELATED APPLICATIONS

This application is filed of even date with applicants copending application Ser. No. 844,848 entitled Process For Carbonating Complex Brines Containing Carbonates And Borates, now abandoned.

BACKGROUND OF THE INVENTION

1. Field of the Invention

This invention relates to the production of sodium carbonate from a complex brine such as that which occurs naturally at Searles Lake, California or from an artificial brine by carbonating the brine to form sodium bicarbonate, crystallizing the sodium bicarbonate and drying the crystallized sodium bicarbonate to form sodium carbonate, and recystallizing the sodium carbonate to form a dense ash, finished product.

2. Description of the Prior Art

Various methods have been disclosed in the past for the production of sodium carbonate and sodium bicarbonate from complex brines such as naturally occur at Searles Lake, California or from artificial brines containing sodium carbonate and, or, sodium hydroxide. Examples of these processes are provided by U.S. Pat. Nos. 1,000,138 and 1,016,239 issued to Wrinkle et al, U.S. Pat. No. 1,215,543 issued to Jones et al, U.S. Pat. No. 1,330,573 issued to Bacon et al, U.S. Pat. No. 1,674,474 issued to Kuhnert, U.S. Pat. No. 1,865,833 issued to Chesny and U.S. Pat. No. 2,784,056 issued to Wiseman.

Basically, these processes provided for the carbonation of the brine to provide a saturated solution from which sodium bicarbonate was separated from the brine and it was customarily calcined to produce sodium carbonate.

All of the above processes have experienced some success but problems have still been present. Normally, in drying material such as bicarbonates wherein there are filtration and drying processes it has been found that a maximum permissible feed "free moisture" content exists from the filtration process to enable the bicarbonate to be adequately dried. In many instances, the free moisture content after filtration has been found to exceed 20 percent by weight of the feed.

The basic problem caused by such excessive free moisture has been a tendency for the feed material to stick to the heat transfer surfaces of the dryer as the feed enters the drying unit, thus fouling and or plugging of the dryer results and process shutdown is required. This problem has been remedied in the past by mixing with the moisture laden feed a recycle stream of dried sodium carbonate to reduce the moisture content of the feed to a point below which the sticking tendency is no longer prevalent. This has previously resulted in recycle ratios in excess of 3 to 1 for the dried sodium carbonate to moisture laden feed and as a result the size of the dryer vessel has been determined by the necessary capacity required to handle the combined feed and recycle rather than the heat transfer capability of the dryer vessel. Thus, larger, considerably more expensive dryers were required to be used to successfully dry the bicarbonate than would otherwise be necessary.

An additional problem which has arisen with the advent of environmental pollution standards and the increased costs of producing carbon dioxide for process uses has been the removal of non-condensable gases from the steam tubes utilized to heat the dryer vessels. In the past, such heating systems have been designed such that the steam tubes penetrated the end of the dryer from which the feed enters and were collected in a manifold system for removal.

Normally, the point at which the steam tubes penetrated the dryer endwall was provided with a flexible packing seal to allow for expansion of the steam tubes but prevent process off gases, primarily carbon dioxide, and dust produced in the dryer vessel from escaping into the atmosphere during some operating conditions while also preventing air inleakage and consequent dilution of the carbon dioxide containing off gas produced therein at other operating conditions. The various seals which have been developed have each necessitated frequent maintenance and replacements, necessitating process shut-downs leading to less economical processes than would otherwise be possible if this problem could be eliminated.

Thus far, in spite of the drawbacks described above in the production of sodium carbonate from sodium bicarbonate recovered from naturally occurring or artificial brines, no process has been developed to satisfactorily alleviate these problems.

SUMMARY OF THE INVENTION

It has now been discovered that sodium carbonate can be produced from brines by the process hereinafter disclosed with an alleviation of the problems previously enumerated and as a result, a more economical, more ecologically acceptable process, with superior carbon dioxide process gas recovery has been developed.

In the practice of this invention, a brine such as that which is found naturally occurring at Searles Lake, California is subjected to carbonation by the process disclosed by co-pending application Ser. No. 844,848 entitled "Process For Carbonating Complex Brines Containing Carbonates And Borates" and crystallization to provide a brine slurry containing crystallized sodium bicarbonate which thereafter is filtered to produce a "wet cake" feed of sodium bicarbonate defined as the sodium bicarbonate filter cake containing entrained brine possessing a free moisture content in a range of from about 12 percent to about 23 percent by weight of the feed. The wet cake feed then enters a drying zone wherein the wet cake feed is subjected to pre-drying to reduce the free moisture content of the wet cake feed to a level in a range of from about 4 percent to about 14 percent by weight of the feed and preferably to a level in a range of from about 6 percent to about 12 percent by weight of the feed. The predried feed thereafter enters a high efficiency mixer wherein the predried feed is mixed with a recycle stream of sodium carbonate, the amount of sodium carbonate being greater than about 110 percent by weight of the quantity of sodium carbonate which would be stoichiometrically required to chemically bind all of the free moisture content of the feed. Thus, the problem of "sticking" is alleviated by reducing the free moisture content of the feed to a level below which it normally will not occur. Further, the pre-dryer enables a smaller recycle ratio to be employed than previously possible so that the dryer is sized not by the volume which must be recycled but by the heat transfer capability of the dryer, and as a consequence a smaller dryer can be employed.

Still further, the dryer is constructed such that the steam tubes utilized to heat the dryer terminate internally within the dryer and thus eliminate seal problems and result in decreased dusting and decreased dilution of carbon dioxide for reutilization in the carbonation process. The dried sodium carbonate is then split into two streams; (1) for recycle and (2) for product recovery. The product stream then enters a bleacher to remove organic contaminants remaining in the product prior to redissolution, recrystallization and drying to provide a high density high purity, uniform crystal shape and size product of sodium carbonate.

DESCRIPTION OF THE PREFERRED EMBODIMENTS

Figure 1B:
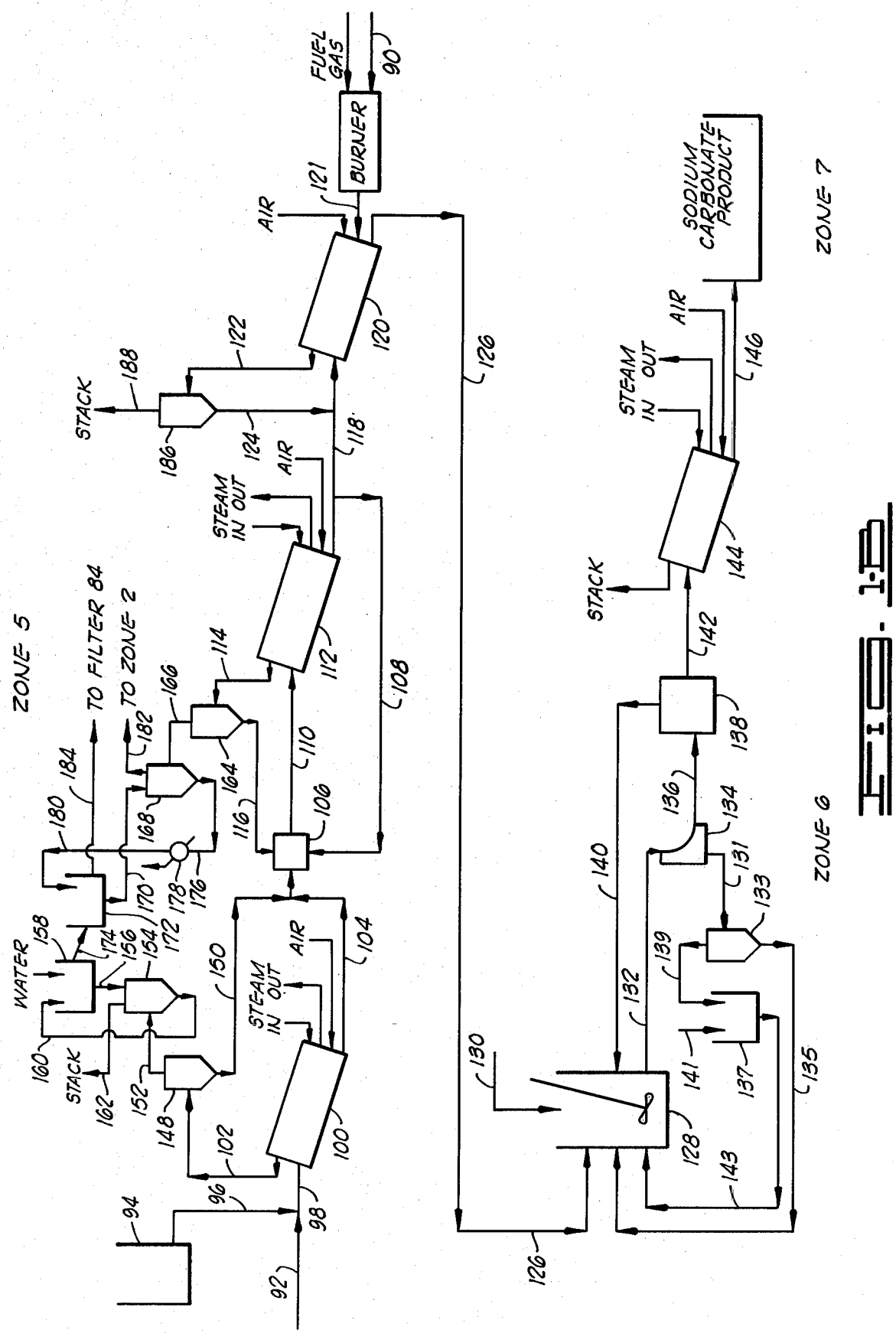
FIGS. 1-A and 1-B are a schematic, diagrammatic illustration of the process of the present invention.

The practice of this invention can be considered to comprise a process involving seven zones.

Turning now to FIG. 1A, zone one comprises natural and or artificial brine storage facilities.

Zone two comprises a brine carbonation process such as is disclosed in copending application Ser. No. 844,848, now abandoned, hereinbefore mentioned.

Zone three comprises a multi-stage carbonated brine cooling and crystallization process which effects a controlled crystallization of the brine to obtain optimum recovery of the sodium bicarbonate produced.

Zone four comprises a filtration process to recover the crystallized sodium bicarbonate from the brine.

Turning now to FIG. 1B, Zone five comprises a drying zone as will be more fully described hereinafter.

Zone six comprises a sodium carbonate recrystallization and drying process.

Zone seven comprises sodium carbonate storage facilities.

In zone one (FIG. 1A), a vessel 10 provides storage for the brine feed, which is withdrawn via a line 12 by a pump 14 to flow by a line 16 to enter zone three and then zone two. The brine feed contemplated in the practice of this invention can be a naturally occurring brine such as is found at Searles Lake, California, a regenerated brine or an artificial brine such as a burkeite solution (a double salt of sodium carbonate and sodium sulfate) produced as a by-product of other plant processes or any admixture of a naturally occurring and artificial brine. The brine feed is heated by counter-current heat exchange with the cooling apparatus in zone three before entering zone two.

In zone two, the hot brine feed is subjected to controlled carbonation with carbon dioxide gas at an elevated temperature by the process disclosed by applicant in copending application Ser. No. 844,848, hereinbefore mentioned and incorporated herein by reference. The brine is heated further during carbonation by the heat generated by the exothermic carbonation reaction. The carbonated slurry then is withdrawn via a line 18 to reenter zone three. The carbonated brine slurry exiting zone two is at an elevated temperature level in the range of from about 125 degrees F. to about 165 degrees F.

In zone three, the hot carbonated brine slurry flowing in line 18 is subjected to multi-stage cooling and crystallization. For purposes of explanation a four-stage crystallizer process will be described, but it is to be understood that other multi-stage crystallizer processes would also be applicable and that the process so described is not intended to limit the process of applicants invention. Each stage will consist of an agitated tank having a minimum residence time of from about 10 to about 60 minutes.

The hot carbonated brine slurry in line 18 admixes with cooled recycle first stage slurry contained in a line 20 (to be more fully described hereinafter) and flows by a line 22 through a pump 24 to enter a first plate heat exchanger 28 via a line 26. The hot carbonated brine slurry is cooled by heat exchange with carbonator brine feed flowing in a line 16 and exits exchanger 28 via a line 30 to enter a first stage crystallizer vessel 34 wherein further precipitation of sodium bicarbonate occurs to form a first stage slurry comprising brine and precipitated sodium bicarbonate. A portion of said slurry is withdrawn via line 20 to admix with the hot carbonated brine advanced in line 18 in a ratio of about 0.25 to 1 to about 4 to 1 by volume. Another portion of said slurry is withdrawn by a line 36 to admix with second stage slurry contained in a line 38 and flow via a line 40 through a pump 42 to enter a second plate heat exchanger 44 via a line 46. The slurry comprising first and second stage slurry is cooled by further heat exchange with the carbonator brine feed in line 16 and flows by a line 48 to enter a second stage crystallizer vessel 50. In second stage crystallizer vessel 50, additional sodium bicarbonate precipitation occurs to form a second stage slurry. It is a portion of this slurry that flows by line 38 to admix with the first stage slurry advanced in line 36. Another portion of this second stage slurry is withdrawn by a pump 54 in a line 52 and pumped by a line 56 to enter a third plate heat exchanger 58. In the third plate heat exchanger 58 the slurry comprising the second stage slurry is cooled by heat exchange with brine filtrate end liquor entering via a line 60 from zone four (to be more fully described hereinafter) flowing through exchanger 58 and then passes to a third stage crystallizer vessel 64 via a line 62 for additional agitation and precipitation to form a third stage slurry which is withdrawn by a pump 68 in a line 66 and pumped by a line 70 to enter an ammonia heat exchanger 72 or any other conventionally known heat exchanger wherein the third stage slurry advanced is cooled to a final crystallizer temperature level in the range of from about 60 degrees F. to about 80 degrees F. after which the third stage slurry flows by a line 74 to enter a fourth stage crystallizer vessel 76 wherein final precipitation of residual precipitatable sodium bicarbonate occurs to produce a fourth stage slurry. The temperature of the slurry is maintained such that at no time during the crystallization process is the temperature allowed to fall below a level of from about 50 degrees F. to about 60 degrees F. in the multi-stage crystallizers. The fourth stage slurry is withdrawn from fourth stage crystallizer vessel 76 by a pump 80 via a line 78 and pumped by a line 82 to enter zone four. Thus, a temperature reduction of from about 165 degrees F. to about 60 degrees F. occurs in the crystallization process of zone three.

In zone four, the fourth stage slurry entering by line 82 is subjected to vacuum filtration and washing in a bicarbonate filter 84 to produce at least one stream comprising a sodium bicarbonate filter cake hereinafter referred to as "wet cake", a second stream comprising brine filtrate end liquor, at least a portion of which is utilized for heat exchange with the second stage slurry and a third stream comprising wash filtrate and gases. In operation, the fourth stage slurry, comprising crystallized sodium bicarbonate and mother liquor which may include sodium and potassium chloride and sulfates, aluminates, silicates, borates and other organic matter is filtered to separate the crystallized bicarbonate from the mother liquor. However some mother liquor will remain entrained in the crystalline mass after filtration which should be removed in order to reduce the impurities content of the filter cake. A thorough and complete washing of the filter cake will at least substantially remove the mother liquor and associated impurities. However, such complete washing normally greatly lowers the yield of bicarbonate due to partial dissolution by the wash liquid.

It has now been discovered that this disadvantage can be economically overcome through use of the process of this invention to provide an optimum yield of crystallized sodium bicarbonate which will contain very little in the way of entrained impurities. This optimum yield is obtained by using a wash liquid entering via a line 184 which comprises a sodium bicarbonate-rich solution stream (to be more fully described hereinafter). The use of a sodium bicarbonate-rich solution stream enables a substantial displacement of the mother liquor and associated impurities from the crystallized sodium bicarbonate during filtration to form the brine filtrate end liquor without any substantial dissolution of the crystalline mass during washing to yield a higher purity wet cake in increased quantities. After filtration and washing, the wet cake possesses a free moisture content in the range of from about 12 percent to about 23 percent by weight of the feed. The term "free moisture" as used herein refers to water present as water, water vapor, a sodium carbonate solution, a sodium bicarbonate solution, a sodium carbonate and bicarbonate solution, or a solution containing any other soluble salts in which the water present is not chemically bound in the salt.

This term is further defined as specifically excluding "water of hydration" which is considered to be chemically bound.

The was filtrate and gases are withdrawn from filter 84 via a line 86 and are separated to from wash filtrate and filter exhaust gas containing hydrogen sulfide in a separator 88. The filter exhaust gas flows by a line 90 to enter a bleacher 120 contained in zone 5 for combustion of the sulfides and removal of the resulting sulfur dioxide as sodium sulfate by reaction with a portion of the bleached light ash produced therein to provide an ecologically acceptable off gas for venting to the atmosphere. In some instances, brine filtrate end liquor also can be introduced into line 86 for separation with the wash filtrate via a line 87.

The small amount of sodium sulfate which is added to the bleacher product is removed during subsequent recrystallization and purification of the sodium carbonate to produce the dense ash product.

The wet cake produced in bicarbonate filter 84 is withdrawn via a line 92 for transportation to zone five.

In zone five (FIG. 1B), sodium nitrate solution contained in a vessel 94 flows on feed control by a line 96 to admix with the wet cake in line 92 to pass by a line 98 into a pre-dryer 100. Alternatively, the sodium nitrate can be added at any point prior to entry into the bleacher 120. Pre-dryer 100 comprises a pre-dryer wherein wet cake and hot air, produced by indirect heat exchange with low or high pressure steam or a combination thereof, cocurrently flow therethrough to produce a predried wet cake possessing a free moisture content in the range of from 4 percent to about 14 percent by weight of feed and preferably in a range of from 6 percent to about 12 percent by weight of feed. To prevent significant decomposition of the wet cake and consequent loss of the carbon dioxide, the moisture level of the solids discharged from the pre-dryer 100 is maintained above at least about 2 percent by weight.

The predryer further recognizes the tendency of wet cake to stick to hot surfaces and includes such features as knockers to prevent sticking near the feed end and internals designed for maximum air-wet cake contacting.

The pre-dryer off gas which will contain dust from the partially dried wet cake will be removed by a line 102 to flow to a cyclone 148 wherein most of the dust is recovered and returned to the feed of the bicarbonate dryer (to be more fully described hereinafter) via a line 150. The off gas exits the cyclone 148 via a line 152 to enter a wet scrubber 154.

That dust which is not returned to the feed of the bicarbonate dryer is removed from the pre-dryer off gas by passage through the wet scrubber 154 by contacting the gas stream with a stream of scrubber water entering via a line 156 from a scrubber water reservoir tank 158 to dissolve the sodium bicarbonate therein and produce a sodium bicarbonate and carbonate containing solution and a scrubbed pre-dryer off gas stream. The sodium bicarbonate and carbonate containing solution then is returned to the reservoir via a line 160 for recirculation to the scrubber 154 and the off gas is withdrawn via a line 162 for passage to a stack for venting.

To reduce the tendency of the wet cake to form dust, and thereby improve the yield of sodium bicarbonate from the process, it has been discovered that the moisture level of the partially dried wet cake should be maintained above about 4 percent and preferably about 6 percent, by weight of the wet cake.

Thereafter, the predried wet cake flows by a line 104 to enter a high efficiency mixer 106 wherein the predried wet cake is admixed with recycled sodium carbonate (hereinafter referred to as unbleached light ash and to be more fully described hereafter) entering mixer 106 by a line 108 with the amount of unbleached light ash being greater than about 110 percent by weight of the quantity of unbleached light ash which would be stoichiometrically required to chemically bind all of the free moisture content of the predried wet cake. It has been found that the practice of the process of this invention substantially alleviates the sticking problem normally present in the bicarbonate dryer, and further reduces the quantity of unbleached light ash that must be recycled to alleviate the sticking problem to a level considerably below those disclosed by the prior art. In many instances, the ratio of recycled unbleached light ash to moisture laden feed will be less than 1 to 1 thereby permitting a smaller, more economical dryer to be employed which is sized by its heat transfer capability rather than its ability to handle a large recycle ratio. Thus, a much more economical process than heretofore believed possible results as both capital costs and dryer operating costs are decreased through use of a smaller dryer.

The bicarbonate dryer feed, from mixer 106, flows by a line 110 to enter a bicarbonate dryer 112 for heat exchange with steam tubes containing high pressure steam.

In bicarbonate dryer 112, the bicarbonate dryer feed decomposes to form unbleached light ash and dryer off gas comprising carbon dioxide and water vapor. The dryer off gas and any dust produced in the drying process is removed via a line 114 to enter a cyclone 164 wherein most of the dust is recovered and returned to the mixer 106 via a line 116. The off gas exits the cyclone 164 via a line 166 to enter a wet scrubber 168.

That dust which is not returned to the mixer 106 is removed by passage through the wet scrubber 168 by contacting the gas stream with a liquid stream comprising a portion of the sodium bicarbonate and carbonate containing solution stream produced by the predryer scrubber 154 entering via a line 170 from a reservoir 172 connected to reservoir 158 via a line 174. The liquid stream dissolves the dust to provide additional sodium bicarbonate and carbonate solution which is withdrawn from scrubber 168 via a line 176 and passed through a heat exchanger 178 wherein the scrubber solution is cooled before entering reservoir 172 via a line 180. The sodium carbonate containing solution produced within scrubber 168 is carbonated as a consequence of the substantial concentration of carbon dioxide present in the dryer off gas thereby yielding a sodium bicarbonate-rich solution stream and a carbon dioxide gas stream for recycle. The carbon dioxide gas stream is withdrawn from scrubber 168 via a line 182 and passed to zone two to provide carbon dioxide for use in the carbonators. Additionally, water vapor is condensed from the dryer off gas in the scrubber 168 as a result of contacting the gas stream with the liquid stream. The sodium bicarbonate-rich solution stream withdrawn in line 176 from scrubber 168 then is passed to the bicarbonate filter 84 from the reservoir 172 via line 184 to provide the wash liquid for displacing the entrained mother liquor from the crystallized sodium bicarbonate filter cake.

The steam tubes utilized in bicarbonate dryer 112 are designed to terminate internally within the end at which the bicarbonate dryer feed enters without penetrating the dryer endwall. It has been found that by not penetrating the dryer endwall, environmental pollution problems can be alleviated and off gas recovery improved as both the possibility of off gas and dust leakage and the possibility of air inleakage and consequent off gas dilution are substantially reduced. Non-condensible gases contained within the high pressure steam can be removed by partial dissolution and liquid transport by the condensate contained within the steam tubes when the tube termination at the dryer feed inlet is a blind plug. Alternatively, the plug can be provided with an orifice to provide a non-condensable gas bleed into bicarbonate dryer 112 wherein the non-condensable gases will also be removed with the dryer off gas or the termination can comprise a thermal trap wherein the released non-condensable gases will also be removed with the dryer off gas.

As a result of the above described features, the recovery of carbon dioxide gas is substantially improved and therefor a more economical overall process results as less make-up carbon dioxide is required for addition to the carbonators in zone two. Further, possible environmental pollution is reduced by elimination of the steam tube packing seals present in conventional steam tube dryers.

The dried unbleached light ash produced by bicarbonate dryer 112 flows by a line 118 to enter the bleacher 120. A portion of the unbleached light ash in line 118 is recycled by line 108 for mixing with the predried wet cake in mixer 106.

In bleacher 120 the unbleached light ash is heated to an elevated temperature level in the range of from about 850 degrees F. to about 900 degrees F. to oxidize color bodies which, if not removed, will render the final product unsuitable for some applications. Bleacher 120 will be heated through the use of combustion gases entering by a line 121. The combustion gases and any dust created by the bleaching will be removed from bleacher 120 by a line 122 to pass to a cyclone 186. The dust is separated from the combustion gases by the cyclone 186 and is returned to line 118 by a line 124 and the combustion gas may be transported to zone six or vented to a stack via a line 188. In some instances, to provide an ecologically acceptable process, it may be necessary to pass the gas through an additional high efficiency dust collector (not shown), such as, an electrostatic precipitator, bag filter, wet scrubber or the like. Alternatively, the dust can be introduced into the recrystallization process in zone six. The hot bleached light ash produced in bleacher 120 is withdrawn via a line 126 for transport to zone six.

In zone six, the hot bleached light ash flowing in line 126 enters a recrystallizer 128 of a type conventionally used by those experienced in the art wherein the hot bleached light ash is admixed with any required make-up water entering by a line 130 and crystallizer slurry contained within the recrystallizer 128 from which sodium carbonate monohydrate crystals having desired physical properties and chemical purity specifications can be recovered for drying to produce a finished dense ash product. A preferred form of the process of zone six is that disclosed in U.S. Pat. No. 3,900,292 issued to Fairchild and assigned to the same assignee as the present invention, and incorporated herein by reference. The temperature of the slurry within the recrystallizer will be maintained at a level within a range of from about 170 degrees F. to about 200 degrees F. through the use of an external heat exchanger (not shown). The slurry density in the recrystallizer will range from about 10 percent to about 40 percent with a preferred density range from about 20 percent to about 35 percent by weight of solids.

The recrystallization will result in a removal of any soluble impurities which may have been present in the wet cake as well as increasing the bulk density of the light ash by producing sodium carbonate in the monohydrate crystalline form.

Generally, the slurry produced in recrystallizer 128 is withdrawn via a line 132 to enter a classifier vessel 134 wherein the slurry is separated into two portions, one portion containing predominately smaller crystals is withdrawn via a line 131 and introduced into a separator 133.

In separator 133, the smaller crystals are separated into two additional portions. One portion containing predominately the larger of the small crystals is withdrawn from the separator via a line 135 and is returned to the recrystallizer 128. The remaining portion is withdrawn and is introduced into a dissolver 137 via a line 139. Make-up water is introduced into the dissolver 137 via a line 141. The discharge stream, from dissolver 137, having dissolved the crystals therein is withdrawn and passed to enter the recrystallizer 128 via a line 143.

The remaining portion in classifier vessel 134 containing predominately crystals which are large enough to be acceptable product, is passed to separator 138 via a line 136. Separator 138 can comprise, for example, a centrifuge. In separator 138 the slurry is separated to produce a product cake comprising primarily sodium carbonate crystals with a free moisture content in a range of from about 2 percent to about 7 percent by weight and a liquid stream comprising recrystallizer mother liquor for recycle to the recrystallizer to reduce the quantities of make-up water required. The liquid stream is removed by a line 140 for return to recrystallizer 128, with a portion of the stream being removed to reduce the soluble impurities content of the mother liquor. The product cake is removed by a line 142 for passage to a dryer 144 wherein both the free moisture and the water of hydration are removed and dried sodium carbonate is produced. Dryer 144 is steam heated. The dried sodium carbonate is withdrawn from dryer 144 via a line 146 for transport to zone seven wherein the sodium carbonate is stored.

The sodium carbonate is dried to a product in which the water of hydration and free moisture have been driven off and evaporated such that the dry product contains less than 0.10 percent moisture.

While the present invention has been described in what is considered to be a preferred embodiment thereof, it is to be understood that changes can be made in the process without departing from the spirit or scope of the invention as defined in the following claims.

What is claimed is:

1. A process for producing sodium carbonate comprising:
   providing a brine containing sodium carbonate;
   subjecting said brine to carbonation in carbonators to produce a hot carbonated brine slurry containing crystallized sodium bicarbonate;
   maintaining the temperature level of said carbonated brine slurry in said carbonators within a range of from about 125 degrees F. to about 165 degrees F.;
   passing said hot carbonated brine slurry to a multi-stage crystallizer to precipitate additional crystallized sodium bicarbonate in the slurry;
   filtering said slurry to produce at least one stream comprising a sodium bicarbonate filter cake or wet cake;
   withdrawing said filter cake or wet cake and subjecting said filter cake or wet cake to pre-drying by heating in a pre-dryer to produce without substantial decomposition a predried wet cake possessing a free moisture content of from about 6 percent to about 12 percent by weight of solids;
   withdrawing said predried wet cake;
   passing said predried wet cake to a mixer wherein said predried wet cake is mixed with a portion of an unbleached light ash produced by drying said predried wet cake in a dryer to form a mixture;
   maintaining the mixing ratio of said predried wet cake and said unbleached light ash such that an amount greater than 110 percent by weight of the quantity of unbleached light ash which is stoichiometrically required to chemically bind all of the free moisture in said predried wet cake is introduced into said mixture;
   withdrawing the mixture from the mixer;
   passing said mixture to said dryer wherein said mixture is dried without substantial sticking of the mixture to the heat transfer surfaces of the dryer to produce said unbleached light ash and a dryer off gas;
   withdrawing a portion of said unbleached light ash from the dryer and mixing said portion of unbleached light ash with said predried wet cake in the mixer to form said mixture;
   withdrawing another portion of said unbleached light ash from the dryer and subjecting said portion to bleaching in a bleacher to remove organic impurities to produce a bleached light ash;
   subjecting said bleached light ash to recrystallization and drying to produce recrystallized sodium carbonate; and,
   withdrawing and recovering said recrystallized sodium carbonate.

2. The filtering of claim 1 defined further as filtering and washing said slurry to produce at least one stream comprising a sodium bicarbonate filter cake or wet cake and a second stream comprising wash filtrate and gases.

3. The process of claim 2 wherein washing said slurry is defined further as washing said slurry with a wash liquid which comprises a sodium bicarbonate-rich solution.

4. The process of claim 3 wherein said wash liquid is defined further as a sodium bicarbonate-rich solution which is obtained by contacting a liquid stream with the dryer off gas and a portion of any unbleached light ash dust produced in the dryer.

5. The process of claim 2 defined further to include the steps of:
   withdrawing the wash filtrate and gases;
   introducing the wash filtrate and gases into a separator;
   separating the wash filtrate and gases in the separator to form a wash filtrate stream and a filter exhaust gas stream containing hydrogen sulfide;
   withdrawing the filter exhaust gas stream;
   introducing the filter exhaust gas stream into the bleacher to convert the hydrogen sulfide contained therein into sulfur dioxide which reacts with a portion of the light ash to form sodium sulfate; and
   withdrawing the sodium sulfate with the remaining bleached light ash.

6. The process of claim 1 wherein subjecting said mixture to drying is defined further as subjecting said mixture to drying in a steam tube dryer in which the steam tubes, containing non-condensable gases terminate internally within the dryer and the dryer off gas contained therein is recovered to produce carbon dioxide for recycle to the carbonators.

7. The process of claim 6 wherein the steam tubes which terminate internally within the dryer are provided with an orifice to bleed non-condensable gases into the dryer interior to be withdrawn with the dryer off gas.

8. The process of claim 6 wherein the steam tubes which terminate internally within the dryer are provided with a thermal trap to bleed non-condensable gases into the dryer interior to be withdrawn with the dryer off gas.

9. The process of claim 1 wherein filtering said slurry to produce at least one stream comprising wet cake is defined further as
   filtering said slurry to produce at least one stream comprising a sodium bicarbonate filter cake or wet cake possessing a free moisture content within a range of from about 12 percent to 23 percent by weight of solids.

10. The process of claim 1 wherein mixing said predried wet cake with unbleached light ash is defined further as mixing said predried wet cake with an amount of unbleached light ash greater than about 110 percent by weight of the quantity of unbleached light ash which is stoichiometrically required to chemically bind all of the free moisture in the predried wet cake.

11. The process of claim 1 wherein passing said carbonated brine to a multi-stage crystallizer is defined further to include the step of
cooling said slurry from an elevated temperature of from about 165 degrees F. to about 60 degrees F.

12. A process for producing sodium carbonate comprising:
providing a brine containing sodium carbonate;
subjecting said brine to carbonation in carbonators maintained at elevated temperature to provide a carbonated brine slurry containing crystallized sodium bicarbonate;
passing said carbonated brine slurry to a multistage crystallizer to precipitate additional crystallized sodium bicarbonate in the slurry;
filtering said slurry to produce at least one stream comprising a sodium bicarbonate filter cake or wet cake;
passing said filter cake or wet cake to a pre-dryer to produce a predried wet cake;
maintaining the temperature level in said pre-dryer at an elevated temperature to produce without substantial decomposition a predried wet cake possessing a free moisture content of from about 6 percent to about 12 percent by weight of solids;
passing said predried wet cake to a mixer wherein said predried wet cake is mixed with a portion of an unbleached light ash produced by drying the predried wet cake in a dryer to provide a dryer feed mixture;
maintaining the mixing ratio of said predried wet cake and unbleached light ash such that an amount greater than about 110 percent by weight of the quantity of unbleached light ash which is stoichiometrically required to chemically bind all of the free moisture in the predried wet cake is introduced into the mixer;
passing said dryer feed mixture to the dryer wherein said dryer feed mixture is dried without substantial sticking of the dryer feed mixture to the heat transfer surfaces of the dryer to produce said unbleached light ash;
withdrawing a portion of said unbleached light ash from said dryer and mixing said portion of unbleached light ash with the predried wet cake to provide said dryer feed mixture;
passing the remaining unbleached light ash in said dryer to a bleacher wherein organic contaminants are oxidized to produce bleached light ash;
passing said bleached light ash to a recrystallization and drying process to produce recrystallized sodium carbonate; and,
recovering said recrystallized sodium carbonate.

* * * * *